United States Patent
Daraiseh et al.

(10) Patent No.: US 10,234,840 B2
(45) Date of Patent: Mar. 19, 2019

(54) EMERGENCY SHUTDOWN SYSTEM FOR DYNAMIC AND HIGH INTEGRITY OPERATIONS

(71) Applicant: Saudi Arabian Oil Company, Dhahran (SA)

(72) Inventors: Abdelghani Daraiseh, Dhahran (SA); Patrick S. Flanders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 148 days.

(21) Appl. No.: 15/259,248

(22) Filed: Sep. 8, 2016

(65) Prior Publication Data

US 2018/0067465 A1 Mar. 8, 2018

(51) Int. Cl.
| | |
|---|---|
| G05B 19/042 | (2006.01) |
| G05B 11/01 | (2006.01) |
| G06F 21/30 | (2013.01) |
| G05B 9/02 | (2006.01) |
| G05B 23/02 | (2006.01) |

(52) U.S. Cl.
CPC ........... *G05B 19/0428* (2013.01); *G05B 9/02* (2013.01); *G05B 11/01* (2013.01); *G05B 23/0291* (2013.01); *G06F 21/305* (2013.01); *G05B 2219/14116* (2013.01); *G05B 2219/24208* (2013.01); *G05B 2219/34465* (2013.01)

(58) Field of Classification Search
None
See application file for complete search history.

(56) References Cited

U.S. PATENT DOCUMENTS

| | | |
|---|---|---|
| 5,422,808 A | 6/1995 | Catanese, Jr. et al. |
| 5,586,050 A | 12/1996 | Makel et al. |
| 6,236,334 B1 | 5/2001 | Tapperson et al. |
| 6,920,409 B2 | 7/2005 | Essam |
| 7,040,336 B2 | 5/2006 | Kim et al. |
| 7,079,021 B2 | 7/2006 | Snowbarger et al. |
| 7,504,961 B2 | 3/2009 | Flanders |
| 7,869,889 B2 | 1/2011 | Flanders et al. |
| 7,905,251 B2 | 3/2011 | Flanders |
| 7,912,563 B2 | 3/2011 | Oosako |
| 8,396,012 B2 | 3/2013 | Daraiseh et al. |
| 8,649,888 B2 | 2/2014 | Daraiseh et al. |
| 8,725,434 B2 | 5/2014 | Flanders |

(Continued)

OTHER PUBLICATIONS

International Search Report and Written Opinion for International Application No. PCT/US2017/050399; International Filing Date Sep. 7, 2017; dated Dec. 19, 2017 (pp. 1-11).

*Primary Examiner* — Carlos R Ortiz Rodriguez
(74) *Attorney, Agent, or Firm* — Bracewell LLP; Constance G. Rhebergen; Christopher L. Drymalla

(57) ABSTRACT

Provided in some embodiments are systems and methods for emergency shutdown (ESD) systems. Embodiments provide for receiving, from a central logic solver (CLS) of an emergency shutdown (ESD) system for a plant via a first communication channel, a command indicative of a first state for an ESD valve, in response to receiving the command, controlling the ESD valve to operate in the first state, obtaining, from a central status monitor (CSM) of the ESD system via a second communication channel, current status information for the plant, determining a second state for the ESD valve based at least in part on the current status information obtained from the CSM, and controlling the ESD valve to operate in the second state.

31 Claims, 6 Drawing Sheets

(56) References Cited

U.S. PATENT DOCUMENTS

| | | |
|---|---|---|
| 8,914,135 B2 | 12/2014 | Daraiseh et al. |
| 9,020,619 B2 | 4/2015 | Panther et al. |
| 2006/0220844 A1 | 10/2006 | Flanders |
| 2013/0006393 A1 | 1/2013 | Fletcher et al. |
| 2014/0269744 A1 | 9/2014 | Flanders et al. |
| 2015/0005904 A1 | 1/2015 | Seberger et al. |

| Scenario | Current Plant Operation | | | Plant Risk Status | | | | | | | | Process Variables | | | Valve Action | |
|---|---|---|---|---|---|---|---|---|---|---|---|---|---|---|---|---|
| | Shut-down | Planned Shut-down | | Leak | Fire | Explosion | Main Power Failure | Backup Power Failure | Local Power Failure | Plant Evac. | Comm. Evac. | PV-1 | PV-2 | PV-3 | Valve State | Fail-Safe Mode |
| 1 | No | No | Exist? | Yes | Yes | No | Yes | Yes | Yes | Yes | No | No reading | 20 | 100 | Fail-Safe | Closed |
| | | | Impact | Partial | Partial | None | All | All | All | Yes | No | | | | | |
| 2 | No | No | Exist? | No | No | No | No | No | No | No | No | 20 | 50 | 100 | No Action | N/A |
| | | | Impact | None | None | None | None | None | None | None | None | | | | | |
| 3 | No | No | Exist? | Yes | No | No | No | Yes | No | No | No | No reading | <5 | 100 | Fail-Safe | Open |
| | | | Impact | Partial | None | None | None | All | None | None | None | | | | | |
| N | No | Yes | Exist? | No | No | No | No | No | No | No | No | 20 | 50 | 100 | Remain Steady | N/A |
| | | | Impact | None | None | None | None | None | None | None | None | | | | | |

FIG. 3

| Current Plant Operation | | | Plant Risk Status | | | | | | | | Process Variables | | |
|---|---|---|---|---|---|---|---|---|---|---|---|---|---|
| Shut-down | Planned Shut-down | | Leak | Fire | Explosion | Main Power Failure | Backup Power Failure | Local Power Failure | Plant Evacuation | Comm. Evacuation | PV-1 | PV-2 | PV-3 |
| No | No | Exist? | Yes | Yes | No | Yes | Yes | Yes | Yes | No | No reading | 20 | 100 |
| | | Impact | Partial | Partial | None | All | All | All | Yes | None | | | |

FIG. 4

EMERGENCY SHUTDOWN SYSTEM FOR DYNAMIC AND HIGH INTEGRITY OPERATIONS

FIELD OF INVENTION

The present invention relates generally to safety systems and more particularly to emergency shutdown (ESD) systems.

BACKGROUND OF THE INVENTION

Industrial safety system (ISS) are often employed in industrial environments, such as oil and gas processing plants, to protect persons and the environment upon the occurrence of a dangerous event, such as a fire. For example, an ISS may be employed in a downstream petroleum processing plant, an upstream drilling site (e.g., an offshore or onshore drilling rig), or the like, to provide automatic shut-down of certain processes in the event of an emergency, such as a fire, a line rupture, processes variables exceeding operational limits, and/or the like. In the case of an emergency, it can be essential to close certain valves (e.g., to stop the flow of hydrocarbons to a process, to direct fluids in a certain direction, or the like), or to open certain valves (e.g., to drain away hydrocarbons, to release pressure, to direct fluids in a certain direction, or the like). The portion of the ISS responsible for enacting these types of process shut-downs is sometimes referred to as an emergency shutdown (ESD) system. An ESD system may be one of many components of an overall ISS used to prevent potentially dangerous events from escalating into dangerous situations. In plant environments, ESD systems often employ emergency shutdown (ESD) valves that can control the flow of fluids or gases (e.g., hydrocarbons) in response to the detection of a dangerous event. Such ESD valves can include fail-safe actuated valves that can be commanded to different states, and that automatically move into a fail-safe state (e.g., open or closed) in the event of an emergency.

There are three common fail-safe states; "fail-safe closed", "fail-safe open", "fail-safe steady". In the case of fail-safe closed, if an ESD valve loses communication with a CLS, for example, it will move to or remain in (or "fail-safe" to) a closed position. Thus, the ESD valve is closed to prevent liquid or gas from passing through a pipe regulated by the ESD valve. In the case of fail-safe open, if an ESD valve loses communication with a CLS, for example, it will fail-safe to an open position. Thus, the ESD valve is opened to allow liquid or gas to pass (e.g., at maximum rate) through a pipe regulated by the ESD valve. In the case of fail-safe steady, if an ESD valve loses communication with a CLS, for example, it will remain steady, at the current state (e.g., remain as is). Thus, the ESD valve is maintained in its current portion (e.g., closed, opened, or partially opened) to continue to regulate flow in the same manner is has been.

In many instances, operation of ESD valves is controlled and coordinated by a central logic solver (CLS) of an ISS. A CLS can act as a central system coordinator that assesses current conditions, determines states for ESD valves based on the current conditions, and controls the ESD valves to operate in the determined states. For example, if a CLS receives information indicating that a hydrocarbon leak is occurring in a pipe regulated by a particular ESD valve, the CLS may determine that the ESD valve needs to be closed to stop the leak and command the ESD valve to close; thereby stopping the flow of hydrocarbons, and effectively stopping the leak. Once the source of the leak has been resolved, the ISS may return to normal operating conditions, and command the ESD valve to open; thereby allowing the flow of hydrocarbons and the related processes to resume.

SUMMARY OF THE INVENTION

Applicants have recognized that, although the centralized nature of a central logic solver (CLS) in an emergency shutdown (ESD) system (or other portion of an overall industrial safety system (ISS)), can be beneficial, it can also have drawbacks that negatively impact the function of the system. For example, a CLS may be able to provide effective control and operation of emergency shutdown (ESD) valves when communication between the CLS and the ESD valves is maintained, and the ESD valves have a sufficient supply of electrical power to operate. If, however, communication or sufficient power is lost, the ESD valves may not operate as desired. For example, if communication between the CLS and an ESD valve is not available during an emergency situation that requires the ESD valve to move into a given state, then the ESD valve may not receive a command to move to the state and, thus, may not enter the desired state. Or, if power to the ESD valve is interrupted, the ESD valve may not have sufficient power to physically actuate its valve mechanism into the desired state, regardless of whether the ESD valve received the command to move to the state. Accordingly, Applicants have recognized that it can be advantageous to have an ESD valve that can operate independent of a CLS (e.g., in the case where communication is severed), and that it can be advantageous to have an ESD valve with an alternate source of power. Applicants have also recognized that it can be advantageous to have a system in which an ESD valve is capable of entering different states, independent of the control of the CLS, especially in the circumstance where the ESD valve is operating independent of the CLS for an extended period. For example, in the case where communication is severed, it can be beneficial to have an ESD valve that can move between fail-safe states as environmental conditions change. In many instances, an ESD valve has only a single fail-safe state. If a single fail-safe state ESD valve loses communication with a CLS or encounters some other fault, the ESD valve may move into its fail-safe state (e.g., open). Unfortunately, a simple temporary loss of communication or other fault between ESD valves can result in the ESD valve moving to its single fail-safe state, potentially shutting down one or more processes despite the fact that there was no actual emergency.

Recognizing these and other shortcomings of existing systems, Applicants have developed novel ESD system and associated methods that employ one or more ESD valves. In some embodiments, the ESD system includes a central controller and one or more ESD valves. The central controller may generally provide for control of the ESD valve; however, at least some of the ESD valves are capable of operating independent of the central controller. In some embodiments, the central controller includes a central logic solver (CLS) and a central status monitor (CSM). The CLS may obtain system status information (e.g., pertaining to plant risk/emergency status) and determine the appropriate states for the ESD valves in the ESD system based on the system status information. The CSM may continually monitor and record current system status information such that it keeps an up-to-date record of the system status information. Under normal operating conditions, such as when the CLS is in communication with an ESD valve, the CLS may control the state of the ESD valve. If, however, communication between the CLS and the ESD valve is not available, local logic of the ESD may obtain the current system status information from the CSM and/or a distributed control system (DCS). The local logic of an ESD valve may include a local controller that can use the current system status information to determine a state for the ESD valve, and, in-turn-control the ESD valve to operate in the appropriate state. That is, the ESD valve may be capable of conducting local control based on system status information received from the CSM when the CLS is unable to provide for control of the ESD valve.

In some embodiments, the ESD valve includes a dual communication interface including a first connection (e.g., an Industrial Ethernet wired connection) to the CLS, and a second connection (e.g., a Wi-Fi wireless network connection) to the CSM. This dual natured connection can ensure that the ESD valve is able to receive system status information when primary communication with the CLS is lost, such as in the event of a fire or explosion that physically severs a first/wired connection between the CLS and the ESD valve. In some embodiments, the ESD valve is connected directly to an instrument system such that it can obtain system status information. For example, an ESD valve may be connected to temperature sensors, pressure sensors, flow rate sensors, and/or the like distributed throughout a plant environment in which the ESD system is employed, and obtain values for process variables directly from instruments. The local controller of the ESD valve may use the system status information (e.g., the values for critical process variables, indications of fire other emergencies in the plant, and/or the like) received from the instrument system in place of or in combination with system status information (e.g., the plant operational status and risk information) obtained from the CSM and/or the DCS to determine a state for the ESD valve, and, in-turn-control the ESD valve into the desired state.

In some embodiments, the ESD valve can employ a local power supply system (e.g., an on-board battery), and can selectively use power from the local power supply system and/or a central power supply system (e.g., AC grid power). In some embodiments, the ESD valve is capable of conducting a self-test operation, and reporting the results thereof. In some embodiments, the ESD valve employs local security measures to provide for secure operation of the ESD valve.

In some embodiments, provided is an ESD system for a plant that includes a central control system including a central logic solver (CLS) and a central status monitor (CSM), and ESD valves. The CLS including a first communication interface coupled to a first communication channel for communicating with each of a plurality of emergency shutdown (ESD) valves of the ESD system. The CLS being adapted to, for each of the ESD valves, determine a desired state for the ESD valve based on status information for the plant, and issue a command adapted to cause the ESD valve to operate in the desired state. The command is communicated to the ESD valve via the first communication interface and the first communication channel. The CSM including a second communication interface coupled to a second communication channel for communicating with each of the ESD valves. The CSM is adapted to maintain a current listing of current status information for the plant, and in response to determining that the CLS is unable to communicate with an ESD valve via the first communication channel, provide, to the ESD valve via the second communication interface and the second communication channel, at least a portion of the current status information for the plant for use in determining an appropriate state for the ESD valve. Each of the ESD valves comprising a valve mechanism adapted to regulate the flow of a medium through a pipe, an actuation system adapted to move the valve mechanism between different operational states, a communication interface coupled to the first and second communication channels, and a local controller. The local controller being adapted to, in response to determining that the first communication channel is unavailable, obtain, from the CSM, current status information for the plant, determine an appropriate state for the ESD valve based at least in part on the current status information obtained from the CSM, and control the actuation system to move the valve mechanism to a position corresponding to the appropriate state. The local controller adapted to, in response to receiving a command from the CLS specifying a desired state for the ESD valve, control the actuation system to move the valve mechanism to the desired state.

In certain embodiments, the first communication channel is different from the second communication channel. In certain embodiments the first communication channel includes a wired connection between the CLS and the ESD valves, and the second communication channel includes a wireless connection between the CSM and the ESD valves. In certain embodiments, the first communication channel includes a wired connection between the CLS and the ESD valves, and the second communication channel includes a wired connection between the CSM and the ESD valves.

In certain embodiments, each of the ESD valves includes a local power supply system adapted to provide sufficient operational power for operating the valve mechanism. In certain embodiments, the ESD system further includes a central power supply system adapted to provide operational power to each of the ESD valves, and each of the ESD valves includes a local power supply system, and a valve power interface adapted to selectively route power from the central power supply system and the local power supply system for use in powering components of the ESD valve. In certain embodiments, the valve power interface is adapted to determine whether sufficient power for powering the components of the ESD valve is available from the, and, in response to determining that sufficient power for powering the components of the ESD valve is not available from the central power supply system, route power from the local power supply system for use in powering the components of the ESD valve.

In certain embodiments, the ESD system further includes an instrument system comprising one or more instruments adapted to obtain values for one or more process variables. The instrument system includes a third communication interface coupled to a third communication channel for communicating the values for one or more process variables to at least one of the plurality of emergency shutdown (ESD) valves, and the local controller of each of the at least one ESD valves is adapted to determine an appropriate state for the ESD valve based at least in part on the values for one or more process variables obtained from the instrument system.

In certain embodiments, the ESD system further includes the local controller is adapted to receive an authorization code and a request to operate the valve in a given state, and, in response to determining that the authorization code is valid, control the actuation system to move the valve mechanism to the given state, and, in response to determining that the authorization code is not valid, not control the actuation system to move the valve mechanism to the given state.

In certain embodiments, the ESD system further includes the local controller is adapted to conduct a self-test operation, generate a report indicative of results of the self-test operation, and, in response to determining that the ESD valve failed the self-test operation, generate an alert indicating that the ESD valve failed the self-test operation.

In certain embodiments, the different operational states comprise at least a first fail-safe state and a second fail-safe state. In some embodiments, the CSM is configured to determine a fail-safe state for the ESD valve based on the status information for the plant, the current status information for the plant includes the fail-safe state for the ESD valve, determining an appropriate state for the ESD valve based at least in part on the current status information obtained from the CSM includes determining the fail-safe state for the ESD valve based at least in part on the current status information obtained from the CSM, and controlling the actuation system to move the valve mechanism to a position corresponding to the appropriate state includes controlling the actuation system to move the valve mechanism to the fail-safe state.

In some embodiments, provided is a method that includes receiving, from a central logic solver (CLS) of an emergency shutdown (ESD) system via a first communication channel, a command indicative of a first state for an ESD valve, in response to receiving the command, controlling the ESD valve to operate in the first state, obtaining, from a central status monitor (CSM) of the ESD system via a second communication channel, current status information for the plant, determining a second state for the ESD valve based at least in part on the current status information obtained from the CSM, and controlling the ESD valve to operate in the second state.

In certain embodiments, the first communication channel is different from the second communication channel. In certain embodiments, the first communication channel includes a wired connection, and the second communication channel includes a wireless connection.

In certain embodiments, the method further includes determining whether sufficient power for powering components of the ESD valve is available from a central power supply system adapted to provide operational power to the ESD valve, and in response to determining that sufficient power for powering the components of the ESD valve is not available from the central power supply system, route power from a local power supply system of the ESD valve for use in powering the components of the ESD valve.

In certain embodiments, determining a second state for the ESD valve is based at least in part on values for one or more process variables obtained from the instrument system via a third communication channel. In certain embodiments, the method further includes receiving an authorization code and a request to operate the valve in a given state, and in response to determining that the authorization code is valid, controlling the ESD valve to operate in the given state.

In certain embodiments, the method further includes determining, by the CLS, the desired state for the ESD valve based on status information for the plant, and issuing, by the CLS, the command indicative of a first state for an ESD valve via the first communication channel. In certain embodiments, the method further includes maintaining, by the CSM, a current listing of current (e.g., key) status information for the plant (e.g., critical plant process variables in addition to plant risk status, such as states for gas leak, fire, explosion, ordered evacuation, and/or the like), and in response to determining that the CLS is unable to communicate with the ESD valve via the first communication channel, providing, to the ESD valve, the current status information for the plant.

In certain embodiments, the ESD valve includes a valve mechanism adapted to regulate the flow of a medium through a pipe and an actuation system adapted to move the valve mechanism between different operational states, and controlling the ESD valve to operate in a given state includes controlling the actuation system to move the valve mechanism to a position corresponding to the given state.

In certain embodiments, the first state comprises a first fail-safe state and the second state comprises a second fail-safe state.

In some embodiments, provided is a non-transitory computer readable storage medium comprising program instructions executable by a computer processor to cause receiving, from a central logic solver (CLS) of an emergency shutdown (ESD) system via a first communication channel, a command indicative of a first state for an ESD valve, in response to receiving the command, controlling the ESD valve to operate in the first state, obtaining, from central status monitor (CSM) of the ESD system via a second communication channel, current status information for the plant, determining a second state for the ESD valve based at least in part on the current status information obtained from the CSM, and controlling the ESD valve to operate in the second state.

Accordingly, embodiments can provide for ensuring that an emergency isolation valve moves to appropriate "failsafe" position when required, e.g., in the event of an emergency, even when a primary power supply (e.g., electrical, pneumatic, and/or hydraulic) is not available.

BRIEF DESCRIPTION OF THE DRAWINGS

FIG. 3 is a table that illustrates an example logic table in accordance with one or more embodiments.

FIG. 4 is a table that illustrates an example system status table in accordance with one or more embodiments.

Figure 1:
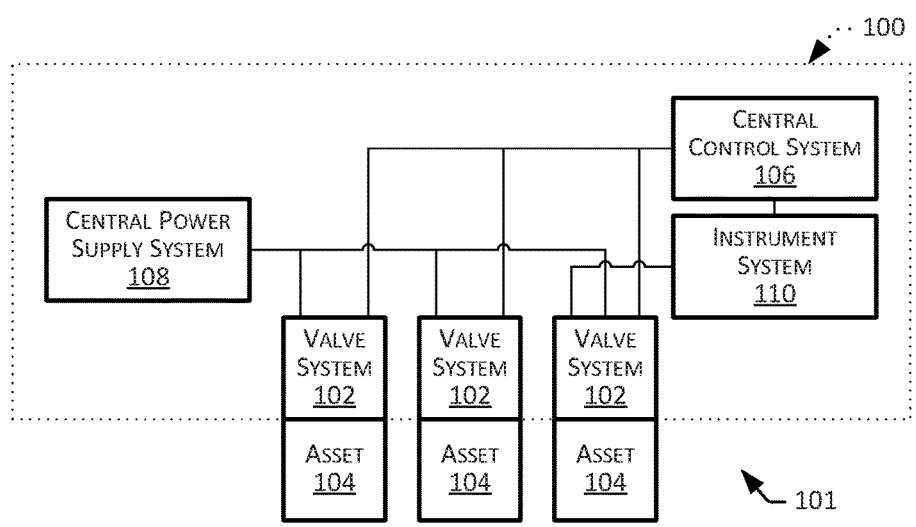
FIGS. 1 and 2 are diagrams that illustrate an emergency shutdown (ESD) system in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

The present invention will now be described more fully hereinafter with reference to the accompanying drawings in which example embodiments of the invention are shown. This invention may, however, be embodied in many different forms and should not be construed as limited to the illustrated embodiments set forth herein, rather, these example embodiments are provided so that this disclosure will be thorough and complete, and will fully convey the scope of the invention to those skilled in the art.

Described herein are embodiments of emergency shutdown system (ESD) (e.g., for a plant) and associated methods that employ one or more emergency shutdown (ESD) valves that are capable of operating independent of a central control system and/or a central power supply system. In some embodiments, the ESD system includes one or more ESD valves for regulating flow in one or more assets (e.g., a pipe or similar conduit in a plant environment in which the ESD system is deployed), a central control system, a central power supply system, and one or more instrument systems. The central control system may include a central logic solver (CLS) and a central status monitor (CSM). The central power supply system may include a primary source of power (e.g., an AC (alternating current) power grid) for supplying power to the ESD system's components, including the one or more ESD valves. The instrument system may include one or more instruments (e.g., temperature sensors, pressure sensors, flow meters, and/or the like) that provide information about process variables in the plant environment (e.g., temperature, pressure, flow rates and the like for various plant processes). The ESD valves may each include a valve mechanism, an actuation system (e.g., for operating the valve mechanism), a local power supply system (e.g., an on-board battery), a local valve power interface (e.g., for selecting between use of power from the central or local power supply system), a local controller, and a valve control interface.

During normal operation, the CLS may monitor various information about the plant environment (e.g., temperature, pressure, flow rates and the like for various plant processes received from the instrument systems, and/or the like), determine the appropriate states of the respective ESD valves, and send to the respective ESD valves communications indicative of the desired states for the ESD valve (e.g., a commands to open, close, partially open/close). In response to receiving a communication, the ESD valve may operate to move its valve mechanism into a position (e.g., opened, closed, partially opened/closed) corresponding to the desired state. This may process can be continuous such that the CLS continually monitors and controls the operation of the ESD valves to maintain safety for the overall plant system in which it is employed.

In some embodiments, the central status monitor (CSM) of the central control system continuously monitors and records system status information (e.g., in a system status table). The system status information can include information about current or planned plant shutdown activities, risk levels, values for process variables, and/or the like. In the event communication between the CLS and an ESD valve is unavailable, the CSM can provide the current system status information to the ESD valve. The local controller of the ESD valve can use the current system status information to determine the appropriate state for the ESD valve, and control the actuation system of the ESD valve to move the valve mechanism of the ESD valve into a position (e.g., opened, closed, partially opened/closed) corresponding to the appropriate state. Such status information can be continuously updated by the CSM, and the CSM can continue to provide updated-current system status information to the ESD valve while communication between the CLS and the ESD valve is unavailable.

In some embodiments, the fail-safe state for an ESD valve can be dynamically updated based on the current conditions (e.g., current system status information). For example, the CLS and/or the CSM may determine a first fail-safe state for an ESD valve at a first time based on current system status information at a first time, and may communicate the first fail-safe state to the ESD valve, and the ESD valve may update its fail-safe status to the first fail-safe state in response to receiving the first fail-safe state from the CLS and/or the CSM. Further, the CLS and/or the CSM may determine a second fail-safe state for the ESD valve at a second time based on a system status at about the second time, and may communicate the second fail-safe state to the ESD valve, and the ESD valve may update its fail-safe status to the second fail-safe state in response to receiving the second fail-safe state from the CLS and/or the CSM. Thus, if the ESD valve encounters an emergency (e.g., loss of communication with the CLS/CSM) between the first time and the second time, then it may operate in the first fail-safe state, and if the ESD valve encounters an emergency after the second time, then it may operate in the second fail-safe state.

In some embodiments, an ESD valve obtains at least some system status information, such as values for process variables, directly from the instrument system. In such an embodiment, the local controller of the ESD valve can determine the appropriate valve state for the ESD valve based on the system status information received from the instrument system and/or the CSM. For example, if communication between the CLS and the ESD valve is not available and/or communication between the CSM and the ESD valve is not available, then the local controller of the ESD valve can determine the appropriate valve state based on the system status information obtained directly from the instruments of the instrument system. Thus, the local controller of the ESD valve may be able to determine the appropriate valve state independent of the central control system. In an embodiment in which the ESD valve obtains system status information (e.g., operational and risk status information) from the CSM and obtains system status information (e.g., values for process variables or other instrument information) from the instrument system, the local controller of the ESD valve can determine the appropriate valve state for the ESD valve based on the system status information obtained from the CSM and/or the instrument system.

In some embodiments, the ESD valve can enter multiple states based on the information received from the CLS and/or the CSM. For example, the ESD valve may move from one state to another based or commands or status information provided by the CLS and/or the CSM. In some embodiments, the ESD valve can enter multiple states, independent of the control of the CLS. For example, during an emergency situation in which communication between the CLS and the ESD valve is unavailable, the local controller of the ESD valve may obtain a first set of system status information from the CSM and/or the instrument system, determine a first state (e.g., closed) for the ESD valve based on the first set of system status information, and control the actuation system of the ESD valve to move the valve mechanism into the first state. At a later time, the local controller of the ESD valve may obtain a second set of system status information from the CSM and/or the instrument system, determine a second state (e.g., open) for the ESD valve based on the second set of system status information, and control the actuation system of the ESD valve to move the valve mechanism into the second state. This may be particularly useful in situations where conditions in a plant environment change while communication between the CLS and the ESD valve is unavailable, and the state of the ESD valve needs to be changed to account for the changes in the plant environment. For example, if a fire is detected in the plant and the ESD valve is initially closed to stop fluid flow in a pipe, but the fire causes the temperature of the fluid in the pipe to rise significantly, thereby increasing pressure in the pipe, it may be necessary to open the ESD valve to relieve the fluid pressure to prevent the pipe from rupturing.

In some embodiments, once communication between the CLS and the ESD valve is restored, control is returned to the CLS. That is, for example, if communication between the CLS and the ESD valve is lost, the ESD valve may be controlled locally by the local controller based on obtained system status information; but, once communication between the CLS and the ESD valve is restored, the state of the ESD valve may again be controlled remotely by the CLS, as explained above with regard to normal operating conditions.

Thus, in some embodiments, the dynamic nature of the fail-safe states can enable the ESD valve to operate appropriately without unneeded disruptions to plant operations. For example, the ESD valve may receive dynamic updates to its fail-safe state from the CLS and/or CSM, such that it goes into the state determined by the CLS and/or the CSM in the case of a temporary loss of communication. However, the ability of the ESD to make local determination of its fail-safe state independent of the CLS and/or the CSM can enable the ESD valve to change its state appropriately, in the case on an extended loss of communication. For example, in response to a loss of communication with the CLS and/or the CSM, the ESD valve may operate in a first fail-safe state determined by and communicated from the CLS and/or the CSM prior to the loss of communication. During the time where communication with the CLS and/or the CSM is not available, the ESD valve may monitor system status information provided by the CSM and/or other sources (e.g., directly from plant instruments) to make determinations of the appropriate fail-safe state for the ESD. If, for example, the ESD valve determines that the current fail-safe state is appropriate based on the current system status information (and/or the system status information provided by the CLS and/or the CSM), it may continue to operate in the first fail-safe state. If, for example, the ESD valve determines that a second fail-safe state is appropriate based on the current system status information (and/or the system status information provided by the CLS and/or the CSM), it may change its operation to the second fail-safe state. This type of local monitoring and control by the ESD valve may continue, for example, until communication is restored with the CLS and/or the CSM and the CLS and/or the CSM again provide an indication of an appropriate updated fail-safe state for the ESD valve, at which point the ESD valve may change to that updated fail-safe state.

In certain embodiments, an ESD valve employs local security that can prevent unauthorized users or components from controlling or otherwise operating the ESD valve. For example, the ESD valve may confirm that a user or device (e.g., a second CLS controller) attempting to actuate the valve has sufficient credentials to actuate the valve before actually actuating the valve. For example, the local controller of the ESD valve may receive an authorization code and a request to move the valve to an open state submitted by an operator via a keypad located on the ESD valve. In response to determining that the authorization code is valid, the local controller of the ESD valve may control the actuation system of the ESD valve to move the valve mechanism into the open state. In response to determining that the authorization code is not valid, however, the local controller of the ESD valve may not change the state of the ESD valve. This can ensure that only an authorized users and devices are allowed override the current state of the ESD valve that is determined by the CLS and/or the local controller.

In some embodiments, an ESD valve is capable of conducting self-test operations. For example, when a state change is conducted, the local controller of the ESD valve may monitor the operation of the valve mechanism (e.g., using time-stamped position data for the valve mechanism) to determine whether the operation was completed within a given duration of time. This can be done, for example, to test the ESD valve's ability to complete a commanded fail-safe operation. A report including results of the test (e.g., plotting the travel of the valve mechanism, indicating the time to complete the state change, and/or the like) can be generated. In the event the ESD valve fails the test, a corresponding alert can be generated. The alert may be provided to the CLS and included in the system status information and/or be provided to plant personnel. Such an alert may provide the CLS and/or plant personnel with an indication that the ESD valve needs to be serviced or otherwise examined.

Figure 2:
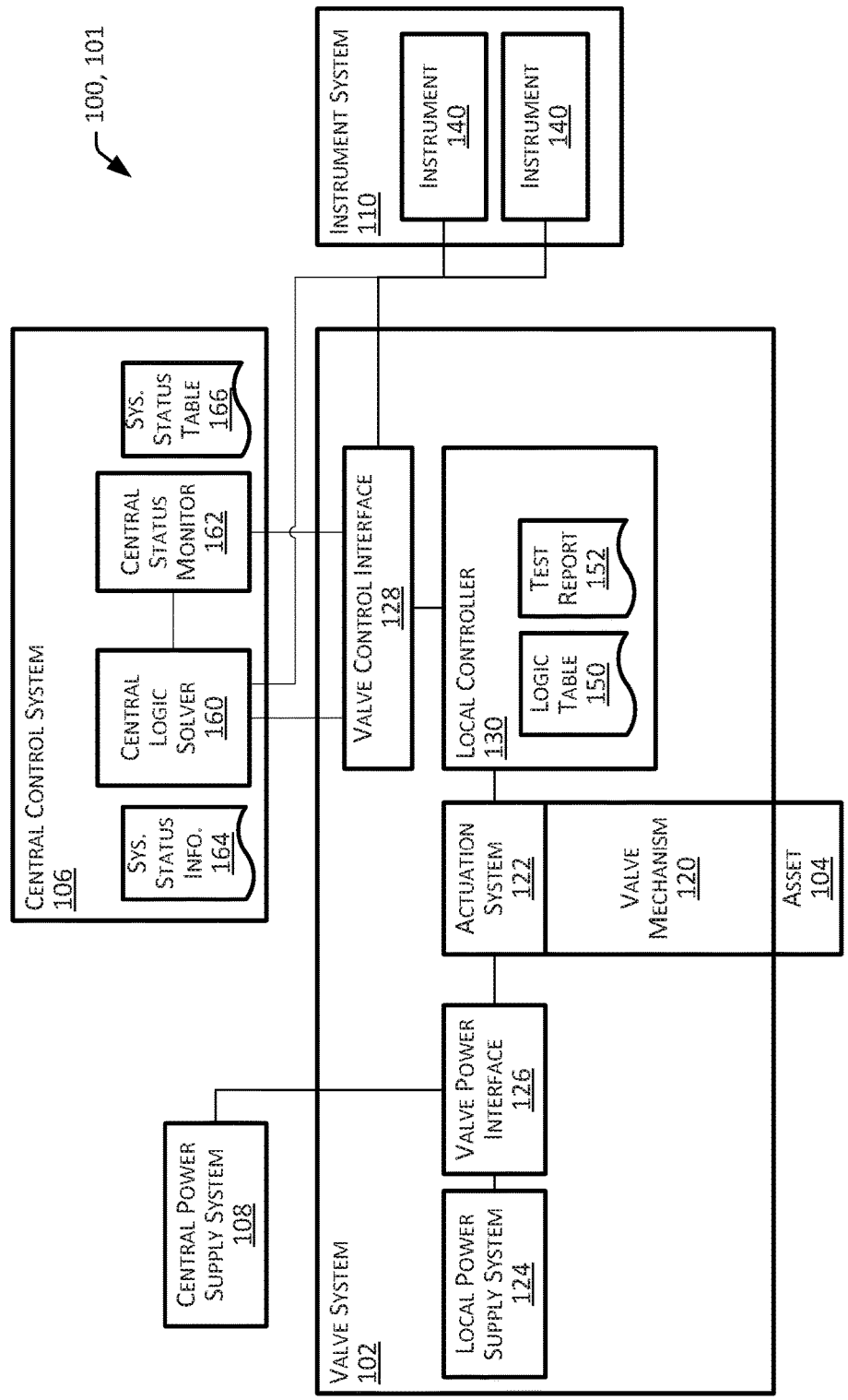

FIGS. 1 and 2 are diagrams that illustrate an ESD system 100 employed in a plant environment (e.g., a plant) 101 in accordance with one or more embodiments. FIG. 1 illustrates a high-level depiction of the ESD system 100, including multiple ESD valve systems (also referred to as "ESD valves" or simply "valves") 102, in accordance with one or more embodiments. FIG. 2 is a low-level depiction of the system that illustrates sub-components of various components of the ESD system 100 in accordance with one or more embodiments. Although only a single valve 102 is depicted in FIG. 2 for the purpose of illustration, embodiments can include multiple valves 102, each employing configurations that are the same or similar to the configuration of the valve 102 illustrated in FIG. 2.

As depicted, in some embodiments, the ESD system 100 includes one or more valves 102 for regulating flow in one or more assets 104 of the plant environment 101, a central control system 106, a central power supply system 108, and an instrument system 110. In some embodiments, the plant environment 101 includes a downstream petroleum processing plant, an upstream drilling site (e.g., an offshore or onshore drilling rig), or the like, and the ESD system 100 includes at least a portion of an industrial safety system (ISS) for the plant that is employed in to provide for automatically shutting-down processes in the event of an emergency, such as a fire, a line rupture, processes parameters (e.g., temperature, pressure, and/or the like process variables) exceeding safe operational limits, and/or the like.

In some embodiments, each of the assets 104 includes a conduit (e.g., a pipe/pipeline, tank, and/or the like) for directing the flow of a medium (e.g., gases or liquids), and the valve 102 attached thereto is capable of regulating the flow of the medium through the conduit. For example, in an embodiment in which the plant 101 is a petroleum processing plant, an asset 104 may include a pipe for transporting hydrocarbons to or from various processes. In such an embodiment, the valve 102 may be closed to stop or otherwise inhibit the flow of the medium through the asset 104, the valve 102 may be opened to allow the flow of the medium through the asset 104, and/or partially opened/closed to throttle the flow of the medium through the asset 104. As described herein, a valve 102 may be, for example, and an ESD fail-safe closed valve (e.g., having a valve control system configured to control the valve in a fail-safe closed manner), an ESD fail-safe opened valve (e.g., having a valve control system configured to control the valve in a fail-safe opened manner), an ESD fail-safe steady valve that is configured to hold its position in the event of an emergency (e.g., having a valve control system configured to control the valve in a fail-safe steady manner), or an ESD state valve configured to move into a given partially opened/closed state in the event of an emergency (e.g., having a valve control system configured to control the valve in a fail-safe partially opened/closed manner).

In some embodiments, some or all of the valves 102, the control system 106 and/or the instrument system 110 are communicatively coupled to one another. For example, as described below, a central logic solver (CLS) of the control system 106 may have a direct connection (e.g., a wired connection) to a communication interface of each of some or all of the valves 102, a central status monitor (CSM) of the control system 106 may have a direct connection (e.g., a wireless connection) to a communication interface of each of some or all of the valves 102, and/or instruments of the instrument system 110 may have a direct connection (e.g., a wired or wireless connection) to a communication interface of each of some or all of the valves 102, the CLS and/or the CSM.

In some embodiments, the central power supply 108 includes a source of power for components in the plant 101 and/or the ESD system 100, such as plant machinery, the valves 102, the control system 106, instruments of the instrument system 110, and/or the like. For example, the central power supply 108 may include an alternating current (AC) utility power grid, a power generator, a fuel cell, and/or the like that provides power to the various components. In some embodiments, the central power supply system 108 may be referred to as a primary power supply system based on it being configured to power the components of the ESD system 100 under normal operating conditions. In some embodiments, the central power supply system 108 is a primary power source for some or all of the valves 102. For example, as described below, the central power supply system 108 may be connected (e.g., via a power cable, such as a wired connection from the CLS) to a valve power interface of each of some or all of the valves 102 such that it can provide operational power to the respective valves 102. As described herein, some or all of the valves 102 may include a secondary power supply, such as an on-board battery, configured to power the valve 102 in the event power is not available from the central power supply system 108, such as in the event of a power outage or a power cable to the valve 102 being severed.

In some embodiments, the instrument system 110 includes one or more instruments 140 of the ESD system 100 and/or the plant environment 101 that provide system status information, such as values for process variables or other instrument information. For example, as described below, the instrument system 110 may include one or more temperature sensors, pressure sensors, flow meters, and/or the like for sensing temperature, pressure, flow rates and/or the like process variables for various system processes. This instrument system status information may be provided, for example, to the central control system 106 (e.g., to the central logic solver and/or the central status monitor) and/or the valves 102 for use in making valve state determinations and/or the like.

Referring to FIG. 2, the valves 102 may each include a valve mechanism 120, an actuation system 122 (e.g., for operating the valve mechanism), a local power supply system 124 (e.g., an on-board battery), a valve power interface 126 (e.g., for selecting between use of power from the central or local power supply systems), a valve control interface 128 and a local valve controller (or "local controller") 130.

In some embodiments, the valve mechanism 120 includes an element that can be moved to regulate the flow of a medium (e.g., fluid or gas) through the valve 102. For example, the valve mechanism may include a valve body (e.g., a disc, gate, or the like) that can be moved to an open, closed and/or partially opened/closed position to regulate the flow of the medium through the valve 102 and the respective asset 104. When the valve mechanism 120 is in the open position, it may enable the flow of the medium through the asset 104. When the valve mechanism 120 is in the closed position, it may prevent the flow of the medium through the asset 104. When the valve mechanism 120 is in a partially opened/closed position, it may throttle, or otherwise restrict, the flow of the medium through the asset 104.

In some embodiments, the actuation system 122 includes a device that physically moves the valve mechanism 120 into an open, closed, or partially opened/closed position. The actuation system 122 may include an automated and/or manual valve actuator that provides mechanical force to move the valve mechanism 120. An automated valve actuator may include, for example, a pneumatic actuator that operates using pressurized gas or fluid to actuate the valve mechanism 120. For example, when actuation of the valve mechanism 120 is called for, pressurized air from a pressurized tank or pump can be introduced into a chamber that expands to overcome a biasing force to move the valve mechanism 120 into the desired state. A manual actuator may include, for example, a threaded stem that is rotated to move the valve mechanism 120 into the desired state. As described herein, the actuation system 122 may be responsive to commands received from the central control system 106 and/or the local controller 130.

In some embodiments, the local power supply system 124 includes a source of electrical power that is capable of supplying electrical power for operating various components of the valve 102, such as the actuation system 122, the local controller 130, and/or the like. The local power supply system 124 may include, for example, an on-board an energy storage device (e.g., a battery) integrated with the valve 102. Such an on-board power source may provide for locally powering the valve 102 when, for example, power is not available from an external source, such as the central power supply system 108.

In some embodiments, the valve power interface 126 includes a device for selectively routing power from the central power supply system 108 and/or the local power supply system 124 to various components of the valve 102. For example, in response to determining that power from the central power supply system 108 is available, the valve power interface 126 may route power from the central power supply system 108 to the actuation system 122, the valve control interface 128 and/or the local controller 130 of the valve 102. In an embodiment in which local power supply system 124 includes an energy storage device (e.g., a rechargeable battery), the valve power interface 126 may route power from the central power supply system 108 to the local power supply system 124 for storage (e.g., for use in charging the battery). In response to determining that power from the central power supply system 108 is not available, the valve power interface 126 may route power from the local power supply system 108 to various components of the valve 102. For example, in the event of a power outage or the power supply cable to the valve 102 being severed, the valve power interface 126 may route power from the local power supply system 108 to the actuation system 122, the valve control interface 128 and/or the local controller 130 of the valve 102 such that the valve 102 operates on locally supplied power, independent of the central power system 108. In response to determining that power from the central power supply system 108 is available, the valve power interface 126 may, then, route power from the central power supply system 108 to various components of the valve 102. This may enable the valve 102 to continue to operate in an emergency condition, such as a fire, when the centrally supplied power may be unavailable to the valve 102, and the valve 102 would otherwise not have sufficient power to operate. That is for example, if the local power supply system were not available, the valve mechanism 120 may not actuate, or may simply move into its fail-safe state, but due to the lack of power would not be able to subsequently change states.

In some embodiments, the valve control interface 128 includes a communication interface capable of communicating via multiple communication protocols. For example, the valve control interface 128 may include a dual communication interface capable of communicating via a wired network and a wireless network. In some embodiments, the CLS and the CSM may use different ones of the networks to provide a robust communication interface. For example, valve control interface 128 may include a first connection (e.g., an Industrial Ethernet wired connection) to the CLS, and a second connection (e.g., a Wi-Fi wireless network connection) to the CSM. This dual natured connection may ensure that the valve 102 is able to receive at least system status information when communication with the CLS is lost, such as in the event of a fire or explosion that severs the physical/wired connection between the CLS and the valve 102.

In some embodiments, the valve control interface 128 includes connections to some or all of the instruments 140 of the instrument system 110. For example, the valve control interface 128 may include a wired connection (e.g., an Industrial Ethernet wired connection) and/or a wireless connection (e.g., a Wi-Fi wireless network connection) to some of the instruments 140 of the instrument system 110. In some embodiments, the valve control interface 128 forwards system status information (e.g., values for process variables and/or other instrument information) obtained from the instruments to the local controller 130 of the valve 102 via the respective connections. As described herein, the local controller 130 may use system status information received from the instrument system (e.g., values for process variables and/or other instrument information) in place of or in combination with system status information (e.g., plant operational status and risk) to determine an appropriate state for the valve 102.

In some embodiments, the local controller 130 is configured to control various operational aspects of the valve 102. For example, the local controller 130 may be configured to determine an appropriate state for the valve 102, and control other components of the valve 102 to cause the valve 102 to operate in the appropriate state. In an embodiment in which communication with the CLS of the central control is available, the local controller 130 may control the valve 102 to operate in the state dictated by a state command issued to the valve 102 by the CLS. For example, where the local controller 130 receives an open command from the CLS (e.g., forwarded by the valve control interface 128), the local controller 130 may command the actuation system 122 to move the valve mechanism 120 to the opened position. In an embodiment in which communication with the CLS of the central control is not available, the local controller 130 may determine an appropriate state for the valve 102 and control the valve 102 to operate in the determined state. For example, in response to receiving an indication from the valve control interface 128 that communication with the CLS is unavailable, the local controller 130 may obtain system status information from the SCM and/or the instrument system 110, determine an appropriate state for the valve 102 based on the system status information from the SCM and/or the system status information provided by the CLS and/or the CSM, and control the valve 102 to operate in the determined state. Thus, the local controller 130 may provide local control the valve 102 in the event the CLS of the central control system 106 is unable to provide for control of the valve 102. In some embodiments, once the CLS is able to provide for control of the valve 102, control may be returned to the CLS. That is, for example, once communication between the CLS and the valve 102 is restored, the state of the valve 102 may again be controlled according to commands issued by the CLS.

In some embodiments, the local controller 130 includes logic for determining an appropriate operational state for the valve 102 based on a set of input conditions. The input conditions may, for example, be provided in the system status information obtained by the local control 130. For example, the local controller 130 may include a logic solver that is configured to determine an operational state for the valve 102 based on a comparison of the current system status information for the plant obtained by the local control 130 and a logic table 150 that maps certain system statuses to corresponding operational states of the valve 102. Thus, the local controller 130 may include logic that maps/matches an operational state (or valve action) for the valve 102 to the current system status information. FIG. 3 illustrates an example logic table 150 (e.g., a "plant risk status" or "plant risk matrix") in accordance with one or more embodiments. Each entry, or "scenario", in the table 150 may map a specific set of conditions to a given valve action. The conditions may include, for example, key plant process variables and plant risk statuses, such as current plant operation status conditions (e.g., indicative of whether the plant is shutdown or planned to be shutdown), plant risk status conditions (e.g., indicative of a risk or occurrence of a leak, fire, explosion, main power failure, backup power failure, local power failure, plant evacuation, and community evacuation), and process variable conditions (e.g., indicative of a value or range of vales for various process variables such as show for PV-1, PV-2 and PV-3). The valve action may include a valve state (e.g., fail-safe, no action, or remain steady) and a fail-safe mode (e.g., closed, open, or partially opened/closed). Thus, the local controller 130 may include logic that maps/matches a valve action (defining an operational state for the valve 102) to the current scenario (defined by the current system status information (e.g., for the plant) 164). As described herein, the local controller 130 may control the valve 130 to operate in the operational state for the valve 102 that is mapped/matched to the scenario defined by the current system status information. In some embodiments, the local controller 130 includes a programmable logic controller (PLC). In some embodiments, the local controller 130 may include, for example, a computer/control system that is the same or similar to computer/control system 1000 described with regard to FIG. 7.

In some embodiment, the local controller 130 can conduct a self-test of the valve 102. For example, the local controller 130 may monitor the movement of the valve mechanism 120 during a state change to determine whether the state change operation was completed within a given duration of time. In some embodiments, such a self-test can be conducted in conjunction with normal valve operation. For example, when a state change is conducted in response to a command from the CLS, the local controller 130 may monitor the displacement of the valve mechanism 120 (e.g., using time-stamped position data provided by sensors in the actuation system 122 and/or the valve mechanism 120) to determine whether the state change operation was completed correctly and within a given duration of time. This can be done, for example, to verify that the valve 102 completed a commanded state change. In some embodiments, such a self-test can be conducted independent of normal valve operation. For example, when conditions permit, such as during a planned shutdown of the plant, the local controller 130 may command the actuation system 122 to move to a given state (e.g., the fail-safe state for the valve 102), and the local controller 130 may monitor the displacement of the valve mechanism 120 (e.g., using time-stamped position data provided by sensors in the actuation system 122 and/or the valve mechanism 120) to determine whether the state change operation was completed correctly and within a given duration of time. This can be done, for example, to confirm that the valve 102 is capable of successfully completing a fail-safe operation in the event of an emergency.

In some embodiments, the local controller 130 generates a test report 140 indicative of the results of a self-test operation. For example, after conducting a self-test of the valve 102, the local controller 130 may generate a test report 152 that includes results of the self-test operation, such as an indication of whether the state change was completed successfully (e.g., test passed/failed), the time-stamped position data, a plotting the travel of the valve mechanism (e.g., displacement vs. time, velocity vs. time, and/or the like), an indication of the total time to complete the state change, and/or the like. Such a report may be stored locally, at a memory of the local controller 130, and may be retrieved at a later time. In some embodiments, the report may be distributed, for example, to the control system 106 for storage in a database of valve test results maintained by the control system 106. In some embodiments, an alert can be generated if the valve 102 fails the self-test. For example, in response to the local controller 130 determining that the valve 102 has failed the self-test, the local controller 130 may cause a warning light, or similar indicator on the valve 102 to be illuminated, the local controller 130 may send an alert (e.g., an e-mail or text message) to personnel overseeing the ESD system 100, the local controller 130 may send an indication of the failure to the central control system 106 for inclusion in the system status information considered by the CLS, and/or the like.

In some embodiments, the local controller 130 employs local security that can prevent unauthorized users or devices from controlling or otherwise operating the valve 102. For example, the valve 102 may confirm that a user (e.g., plant personnel) or device (e.g., a second CLS) attempting to manually control the valve has sufficient credentials to actuate the valve before actually actuating the valve 102. For example, the local controller 130 may receive an authorization code and a request to move the valve to an open state submitted by an operator via a user interface (e.g., a keypad) located on the valve 102. In response to determining that the authorization code is valid, the local controller 130 may control the actuation system 122 to move the valve mechanism 120 into the open state. In response to determining that the authorization code is not valid, however, the local controller 130 may not issue a command to change the state of the valve 102. This can ensure that only an authorized users and devices are allowed override the current state of the valve 102 determined by the CLS and/or the local controller 130.

In some embodiments, the central control system 106 includes the central logic solver (CLS) 160 and the central status monitor (CSM) 162. During normal operation, the CLS 160 may monitor system status information 164 (e.g., for the plant 101), determine the desired states of the valves 102 based on the information, and send, to the respective valves 102, communications indicative of the desired states for the valve 102 (e.g., open, closed, partially open, or the like). For example, in the plant environment 101, the CLS 160 may be configured to obtain system status information 164 indicative of the status of the plant 101, and determine an appropriate state for each of the valves 102 in the plant. In some embodiments, the CLS 160 may control various plant equipment besides the valves 102. For example, the CLS may control operation of pumps, fans, motors, instruments and/or the like. The system status information 164 may include, for example, instrument data obtained from the instrument system 110 (e.g., instrument data indicative of various process variables), valve data obtained from the valves 102 (e.g., valve data indicative of the current state of the respective valves 102), current plant operation status data (e.g., shutdown data indicative of whether the plant is shutdown or planned to be shutdown), plant risk status data (e.g., risk data indicative of the risk or occurrence of a leak, fire, explosion, main power failure, backup power failure, local power failure, plant evacuation, community evacuation, and/or the like). In some embodiments, the CLS 160 is configured to control the valves 102 to operate in the determined states. For example, if the CLS 160 determines an open operational state for first valve 102 and a closed operation state for a second valve 102 based on current system status information 164, the CLS 160 may communicate an open command to the first valve 102, and a closed command to the second valve 102. As described herein, in response to receiving the commands from the CLS 160, the first valve 102 may operate in the open state, and the second valve 102 may operate in the closed state. In some embodiments, the CLS 160 is communicatively coupled to the valve 102 via a reliable industrial network, such as Industrial Ethernet and/or the like. For example, the CLS 160 may be communicatively coupled to a valve communication interface 128 of each of the valves 102 via hardwired Industrial Ethernet cable, and/or the like. In some embodiments, the CLS 160 includes a programmable logic controller (PLC). In some embodiments, the CLS 160 includes a computer/control system that is the same or similar to computer/control system 1000 described with regard to FIG. 7.

In some embodiments, the CSM 162 monitors and records current system status information 164. For example, the CSM 162 may receive the system status information considered by the CLS 160, and record the current system status information 164 in a system status table 166, or similar data record. The system status table 166 may be stored in a memory of the CSM 162. FIG. 4 illustrates an example system status table 166 in accordance with one or more embodiments. In some embodiments, the CSM 162 continually updates the system status table 166 such that it contains up-to-date status information that reflects the current status of the environment of the ESD system 100. For example, the CSM 162 may replicate the system status information 164 in to the system status table 166. In some embodiment, the CLS 160 may push any changes in the system status information 164 to the CSM 162 for inclusion in the system status table 166. For example, the CLS 160 may publish any changes to the system status information to the CSM 162, and the CSM 162 may make corresponding updates to the system status information 164 of the system status table 166. Such an embodiment may reduce overhead by communicating only in the event of changes to the underlying system status information 164. In some embodiment, the CSM 162 may pull system status information 164 from the CLS 160. For example, the CSM 162 may periodically query the CLS 160 for any changes to the system status information 164 (e.g., every 1 second (s), 10 s, 30 s, 1 minute (min), 5 min, or the like), and the CSM 162 may make corresponding updates to the system status table 166 based on the system status information 164 received from the CLS 160. Such an embodiment may reduce overhead by reducing the frequency of communication with between the CLS 160 and the CSM 162, as multiple changes can be communicated in a single query operation. In some embodiments, the CSM 162 includes a computer/control system that is the same or similar to computer/control system 1000 described with regard to FIG. 7.

The ability of the CSM 162 to keep the system status table 166 up-do-date with relatively current information can be useful because, as described herein, the valves 102 may rely on the system status information 164 of the system status table 166 if communication with the CLS 160 in unavailable. For example, if the communication between the CLS 160 and a valve 102 is lost, the local controller 130 of the valve 102 may obtain the system status table 166 (or at least the system status information 164 contained in the system status table 166) from the CSM 162 via an alternative communication channel. The local controller 130 of the valve 102 may, then, use the obtained system status information 164 to determine the appropriate state for the valve 102. In some embodiments, the CSM 162 uses the system status table 166 (or at least the system status information 164 contained in the system status table 166) to determine the appropriate state for the valve 102, and provide an indication of the determined state to the valve 102 (e.g., in the system status information 164). This may allow the valve 102 and/or the CSM 162 to make operational decisions independent of the CLS 160. Continuing with the above example, if the communication between the first valve 102 and the CLS 160 is lost, then the first valve 102 may obtain the system status table 166 from the CSM 162. In some embodiments, the information may be proactively sent from the CSM 162 to the local controller 130 in response to the CSM 162 determining that communication between the first valve 102 and the CLS 160 is lost. In some embodiments, the local controller 130 may query the CSM 162 for the system status information in response to the local controller 130 determining that communication between the first valve 102 and the CLS 160 is lost. As described below, the local controller 130 of the first valve 102 may determine an appropriate state of the valve 102 based on the obtained system status information 164 (e.g., of the system status table 166), and control the valve 102 to operate in the determined state. If, for example, the local controller 130 of the first valve 102 determines that the valve 102 should be in an open state and the valve 102 is currently in the opened state, then no action may be taken. If, however, the local controller 130 of the first valve 102 determines that the valve 102 should be in a closed state and the valve 102 is currently in the opened state, then the local controller 130 may command the actuation system 122 to move the valve mechanism 120 into the closed position.

Although certain illustrative embodiments are described above with regard to the CSM 162 receiving system status information 164 (e.g., used to populate the system status table 166) via the CLS 160, in some embodiments, the CSM 162 may receive status information 164 from a variety of sources. For example, the central status monitor 162 may receive status information 164 from the CLS 160, via a user interface (e.g., status information entered by a user via a user interface), from a distributed control system (DCS) (e.g., a plant control system), from a data histogram (DH), from a power management system (PMS) (e.g., from the central power supply system 108), from a disaster management system (DMS), from the instrument system 150 (e.g., from instruments 140), the valves 102, operators, plant data historians, and/or the like. Thus, the CSM 162 may collect and consolidate system status information 164 from one or more sources, and make that system status information 162 available to the valves 102, plant systems, plant operators, and/or the like, as needed.

In some embodiments, the valve 102 obtains some or all of the system status information 164 from the instrument system 110. For example, the local controller 130 of the valve 102 may obtain system status information 164 (e.g., including values for process variables) from instruments 140 of the instrument system 110 via the valve control interface 128. In such an embodiment, the local controller 130 can make a determination of the appropriate valve state based on this system status information 164 obtained from the instruments 140. This can enable the local controller 130 to determine an appropriate state for the valve 102 independent of the central control system 106. For example, if communication between the CLS 160 and the valve 102 is not available and communication between the CSM 162 and the valve 102 is also not available, then the local controller 130 of the valve 102 can determine the appropriate state for the valve 102 based on the system status information 164 obtained from the instruments 140. In an embodiment in which the valve 102 receives system status information 164 from the central control system 106 (e.g., from the CSM 162) and the instrument system 110 (e.g., from the instruments 140), the local controller 130 of the valve 102 can determine the appropriate state for the valve 102 based on the system status information 164 obtained from the central control system 106 (e.g., from the CSM 162) and/or the system status information 164 obtained from instrument system 110. For example, where the system status information 164 from the central control system 106 includes information about current or planned plant shutdown activities and risk levels, and the system status information 164 obtained from the instrument system 110 includes values for process variables, the local controller 130 of the valve 102 can determine the appropriate state for the valve 102 based on the combined system status information 164.

In some embodiments, the valve 102 can enter various states independent of the control by the CLS 160. For example, during an emergency situation in which communication between the CLS 160 and the valve 102 is unavailable, the local controller 130 of the valve 102 may determine a first state (e.g., closed) for the valve 102 based on an initial/first set of status information 164 obtained by the local controller 130, and control the valve 102 to operate in the first state. The local controller 130 of the valve 102 may subsequently determine a second state (e.g., open) for the valve 102 based on an updated/second set of status information 164 obtained by the local controller 130, and control the valve 102 to operate in the second state. This may be particularly useful in situations where conditions in the plant environment change during the time while communication between the CLS 160 and the valve 102 is unavailable, and the state of the valve 102 may need to be changed to account for the changes in the plant environment. For example, if a fire is detected in the plant and the valve is initially closed to stop fluid flow in a pipe, but the fire also causes the temperature of the fluid in the pipe to rise significantly over time, thereby increasing pressure in the pipe, it may be beneficial to open the valve 102 to relieve the fluid pressure to prevent the pipe from rupturing. In some embodiments, once communication between the CLS 160 and the valve 102 is restored, control may be returned to the CLS 160. That is, for example, if communication between the CLS 160 and the valve 102 is lost, the valve 102 may be controlled locally by the local controller 130 based on obtained system status information 164; but, once communication between the CLS 160 and the valve 102 is restored, the state of the valve 102 may again be controlled remotely by the CLS 160.

Figure 5:
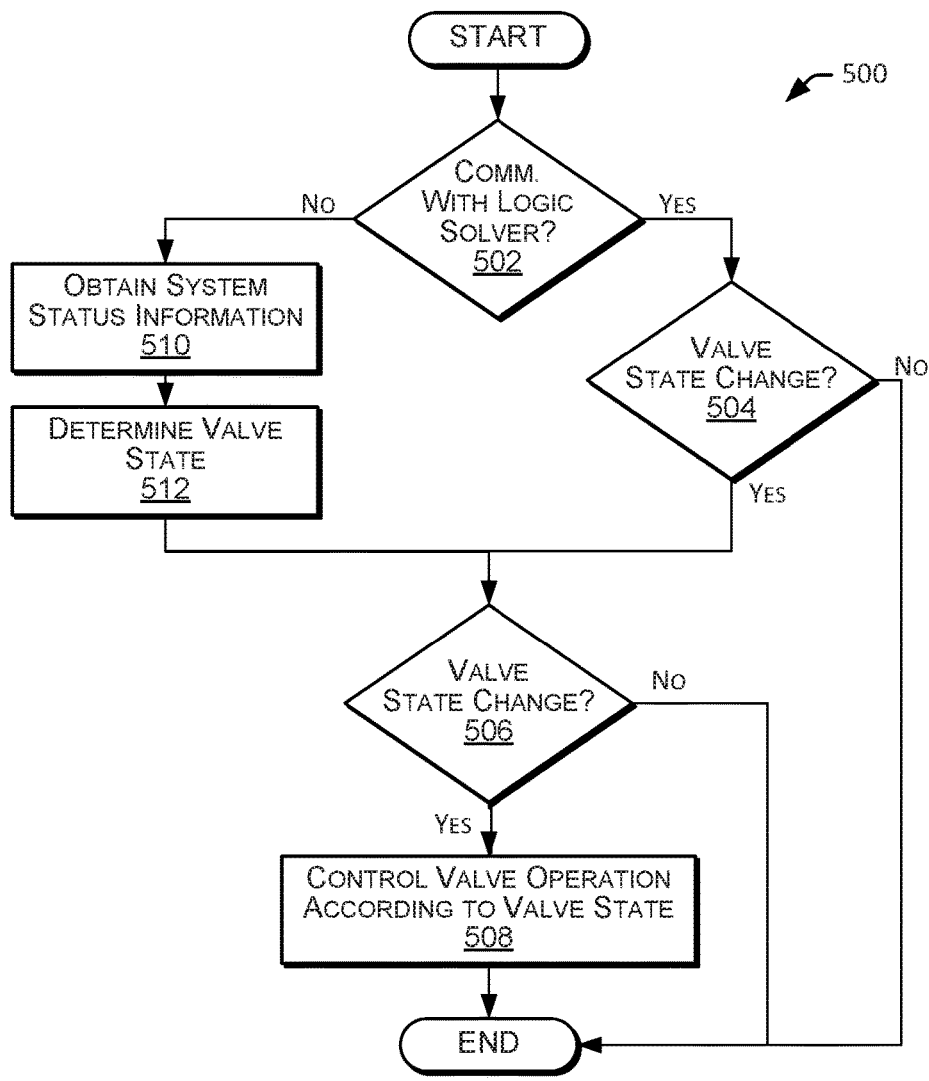
FIG. 5 is a flowchart diagram that illustrates an example method for operating an emergency shutdown (ESD) valve of an ESD system in accordance with one or more embodiments.

FIG. 5 is a flowchart diagram that illustrates an example method 500 for operating a valve 102 in accordance with one or more embodiments. In some embodiments, some or all of the operations of method 500 may be performed by the local controller 130. Method 500 may include determining whether communication with a logic solver is available (block 502). In some embodiments, determining whether communication with a logic solver is available may include the local controller 130 of a valve 102 determining whether or not communication between a CLS 160 of a central control system 106 and the communication interface 128 of the valve 102 is available. For example, the local controller 130 may receive, from the communication interface 128, an indication that communication between the CLS 160 and the communication interface 128 is currently available or unavailable, and/or a command from the CLS 160. The local controller 130 may determine that communication with the CLS 160 is available in response to receiving an indication that communication between the CLS 160 and the communication interface 128 is currently available, and/or a command from the CLS 160. The local controller 130 may determine that communication with the CLS 160 is not available in response to receiving an indication that communication between the CLS 160 and the communication interface 128 is not currently available.

Method 500 may include, in response to determining that communication with a logic solver is available, determining whether a state change command has been received (block 504). In some embodiments, it may determine that a state change command has been received if a command is received from the CLS 160 that specifies an operational state for the valve 102. For example, the local controller 130 may determine that a state change command has been received if a command is received from the CLS 160 that specifies a "closed", "opened" or "partially closed/opened" operational state for the valve 102. If it is determined that no state change command has been received, the method 500 may proceed to end. For example, if the command refers to control of another operation of the valve 102, but does not specify a state for the valve 102, the iteration of the routine may be completed. Of course, in some embodiments, the routine of method 500 may be repeated by the local controller 130 to continually determine an appropriate state for the valve 102, and take appropriate action to control the valve 102 to operate in the state, as described herein. If it is determined that a state change command has been received, the method 500 may proceed to determining whether the state requires a state change of the valve 102 (block 506). In some embodiments, it may be determined that the state requires a state change of the valve 102 if a specified state is different from the current operational state of the valve 102. For example, the local controller 130 may determine that the state requires a state change of the valve 102 if the valve 102 is currently operating in the open state, and the command specifies a "closed" state. The local controller 130 may determine that there is not a request for a state change of the valve 102 if the valve 102 is currently operating in the closed state, and the command specifies a "closed" state.

Method 500 may include, in response to determining that a state change command has been received, controlling the valve according to the valve state (block 508). In some embodiments, controlling the valve according to the valve state includes controlling the valve 102 to operate in the specified state. For example, where the state change command specifies a closed state, the local controller 130 may command the actuation system 122 to move the valve mechanism 120 to the closed position.

Returning to block 502, method 500 may include, in response to determining that communication with a logic solver is not available, obtaining system status information (block 510). In some embodiments, obtaining system status information includes the local controller 130 obtaining system status information 164 from the CSM 162 and/or the instrument system 110. For example, the local controller 130 may query the central status monitor 162 for the system status information 164 in the system status table 162 and/or collect process variable data from one or more instruments 140.

Method 500 may include determining a valve state based on the system status information (block 512). In some embodiments, determining a valve state based on the system status information includes the local controller 130 determining an appropriate operational state for the valve 102 based on the system status information 164 obtained from the CSM 162 and/or the instrument system 110, and using a local logic table 150 for the valve 102. For example, the local controller 130 may determine a "fail-safe/close" valve action/state that corresponds to a "scenario 1" of the local logic table 150 if the system status information 164 obtained from the CSM 162 and/or the instrument system 110 corresponds to the system status information listed in the entry for "scenario 1" in the logic table 150. The method 500 may proceed to determining whether the determined state change requests requires a state change of the valve 102 (block 506) and controlling the valve according to the valve state (block 508) in a manner similar to that described above. For example, the local controller 130 may determine that the determined state requires a state change of the valve 102 if the valve 102 is currently operating in the open state, and the "fail-safe/close" valve action/state is identified based on the system status information 164, and the local controller 130 may command the actuation system 122 to move the valve mechanism 120 to the closed position. As described above, if it is determined that no state change is required, the iteration of the method 500 may end. Of course, the routine of method 500 may be repeated, for example, periodically by the local controller 130 (e.g., every 1 s, 5 s, 30 s, 1 min, 5 min, or the like) to continually determine an appropriate state for the valve 102, and take appropriate action to control the valve 102 to operate in the appropriate state, as described herein.

Figure 6:
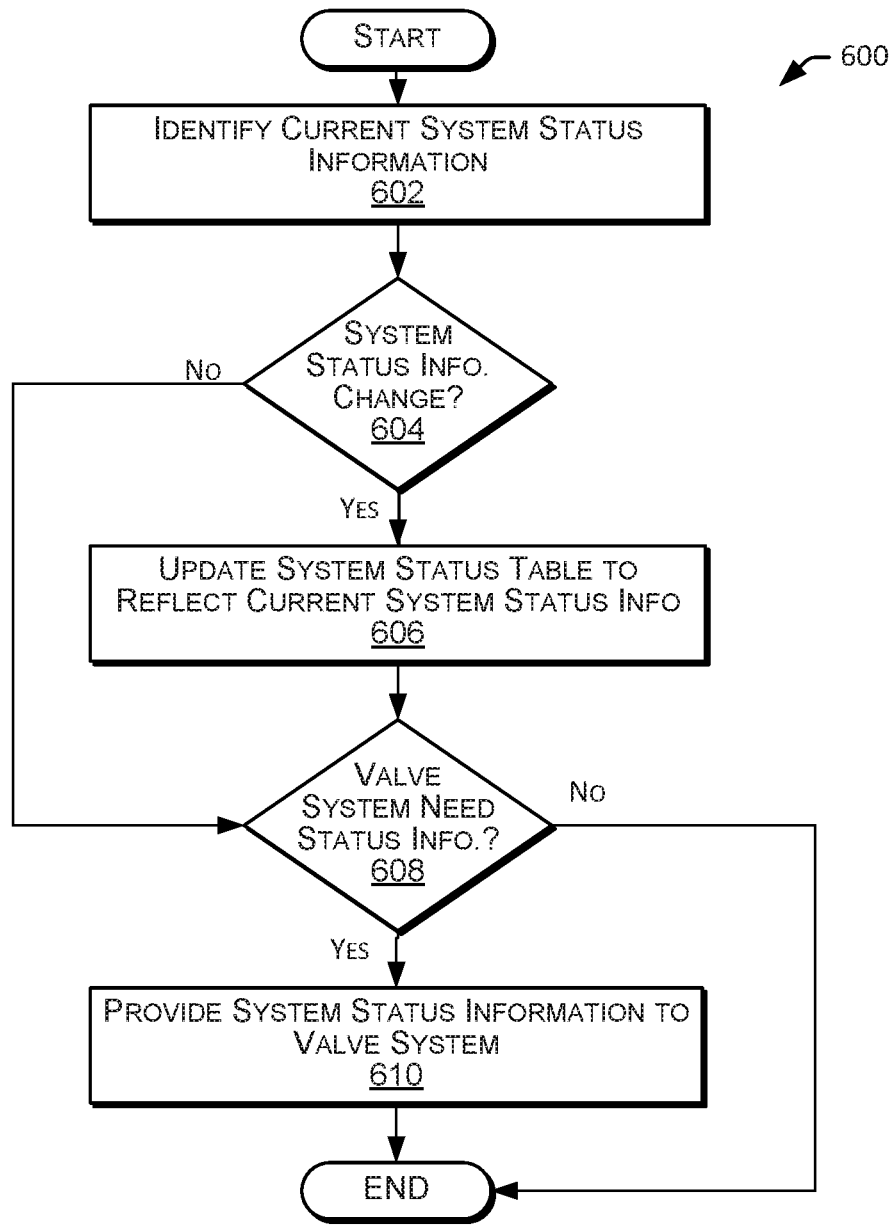
FIG. 6 is a flowchart diagram that illustrates an example method for updating system status information in accordance with one or more embodiments.

FIG. 6 is a flowchart diagram that illustrates an example method 600 for updating system status information in accordance with one or more embodiments. In some embodiments, some or all of the operations of method 600 may be performed by the CSM 162. Method 600 may include identifying current system status information (block 602). In some embodiments, identifying current system status information includes the CSM 162 determining the current system status information 164 stored in the system status table 166. Method 600 may include determining whether there is a change in the system status information (block 604). In some embodiments, determining whether there is a change in the system status information includes the CSM 162 determining whether current system status information 164 has any differences from the system status information 164 stored in the system status table 166. In some embodiments, the CSM 162 may determine that the current system status information 164 is different from the system status information 164 stored in the system status table 166 based on updated system status information 164 being pushed to the CSM 162 by the CLS 160, or another source of system status information 164, such as the instrument system 110. In some embodiments, the CSM 162 may determine that the current system status information 164 is different from the system status information 164 stored in the system status table 166 based on updated system status information 164 received as a result of the CSM 162 querying the CLS 160, or another source of system status information 164, such as the instrument system 110. In response to determining that there is a change in system status information, the method 500 may proceed to updating the system status table to reflect the changes (block 606). In some embodiments, updating the system status table to reflect the changes may include the CSM 162 updating the system status table 166 to reflect the changes such that is an up-to-date representation of the current system status information 164.

In response to determining that there is not a change in the system status information, or after updating the system status table to reflect any changes, the method 500 may proceed to determining whether a valve system is in need of system status information (block 608). In some embodiments, determining whether a valve system is in need of system status information may include the CSM 162 determining whether one or more valves 102 of the ESD system 100 is in need of the system status information 164. In some embodiments, the CSM 162 can determine that a valve 102 of the ESD system 100 is in need of the system status information 164 in response to determining that communication between the CLS and the valve(s) 102 is unavailable. In some embodiments, the CSM 162 may determine that a valve 102 is in need of the system status information 164 in response to receiving a query for the system status information 164 from the valve 102.

In response to determining that a valve system is in need of system status information, the method 500 may proceed to providing the system status information to the valve system (block 610). In some embodiments, providing the system status information to the valve includes the CSM 162 providing the system status table 166 to the valve 102. As described herein, the valve 102 may use the system status information of the system status tables 166 to determine an appropriate operational state for the valve 102. In response to determining that a valve system is currently not in need of system status information or the system status information has been provided to the valve, the iteration of the method 500 may end. Of course, the routine of method 600 may be repeated, for example, periodically by the CSM 162 (e.g., every 1 s, 5 s, 30 s, 1 min, 5 min, or the like) to keep the system status table 166 up-to-date and provide up-to-date system status information to the valves 102, as described herein.

Figure 7:
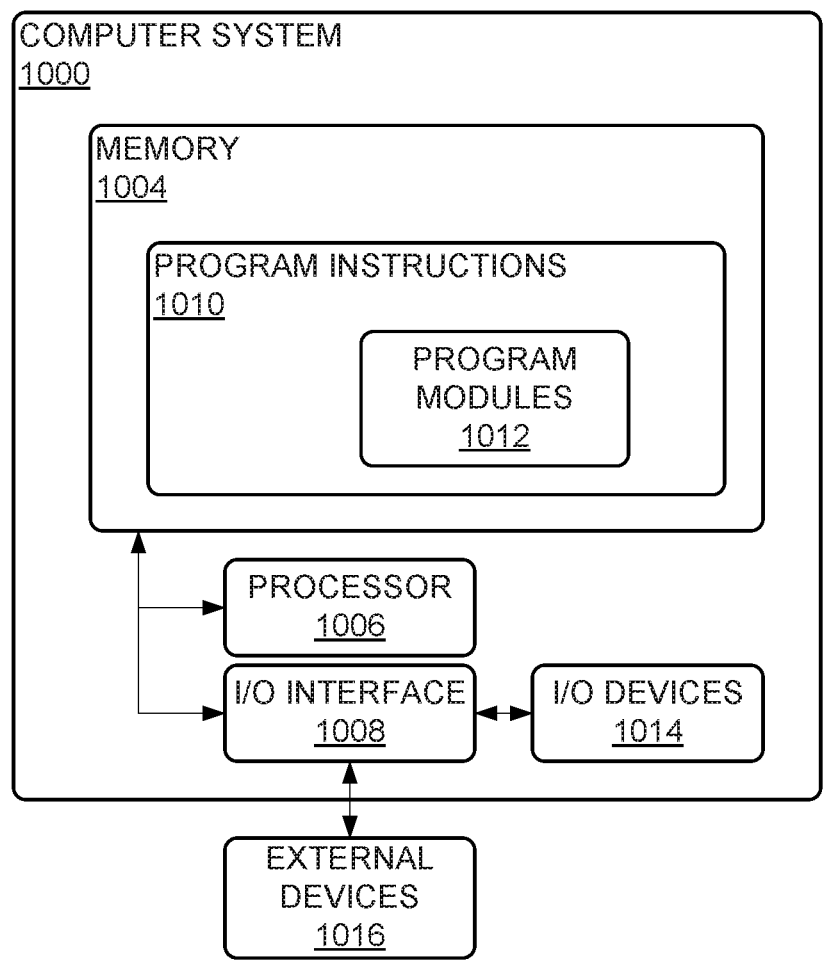
FIG. 7 is a diagram that illustrates an example computer system in accordance with one or more embodiments.

FIG. 7 is a diagram that illustrates an example computer/control system 1000 in accordance with one or more embodiments. In some embodiments, the system 1000 may be a programmable logic controller (PLC). The system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the valves 102 (e.g., the local controller 130 and/or the valve power interface 126) and central control system 106 (e.g., the CLS 160 and/or the CSM 162), and/or the methods 500 and/or 600. In the context of a computer/control system of a valve 102, the program modules 1012 may include one or more modules for performing some or all of the operations described with regard to the local controller 130 and/or the valve power interface 126, and/or the method 500. In the context of a computer/control system of a central control system 106, the program modules 1012 may include one or more modules for performing some or all of the operations described with regard to the CLS 160 and/or the CSM 162, and/or the method 600.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 2006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired (e.g., Industrial Ethernet) or a wireless (e.g., Wi-Fi) connection. The I/O interface 1008 may provide an interface for communication with one or more external devices 1016, such as other computers, networks, and/or the like. In some embodiments, the I/O interface 1008 may include an antenna, a transceiver, and/or the like. In some embodiments, the computer system 1000 and/or the external devices 1016 may include one or more instrument systems 110 and/or instruments 140, such as sensors, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. An emergency shutdown (ESD) system for a plant, comprising:
   a central control system comprising:
      a central logic solver (CLS) comprising a first communication interface coupled to a first communication channel for communicating with each of a plurality of emergency shutdown (ESD) valves of the ESD system, wherein the CLS is configured to, for each of the ESD valves:
         determine a desired state for the ESD valve based on status information for the plant; and
         issue a command configured to cause the ESD valve to operate in the desired state, wherein the command is communicated to the ESD valve via the first communication interface and the first communication channel;
      a central status monitor (CSM) comprising a second communication interface coupled to a second communication channel for communicating with each of the ESD valves, wherein the CSM is configured to:
         maintain a current listing of current status information for the plant; and
         in response to determining that the CLS is unable to communicate with an ESD valve via the first communication channel, provide, to the ESD valve via the second communication interface and the second communication channel, at least a portion of the current status information for the plant for use in determining an appropriate state for the ESD valve; and
   the ESD valves, wherein each of the ESD valves comprises:
      a valve mechanism configured to regulate the flow of a medium through a pipe;
      an actuation system configured to move the valve mechanism between different operational states;
      a communication interface coupled to the first and second communication channels; and
      a local controller configured to:
         in response to determining that the first communication channel is unavailable:
            obtain, from the CSM, current status information for the plant;
            determine an appropriate state for the ESD valve based at least in part on the current status information obtained from the CSM; and
            control the actuation system to move the valve mechanism to a position corresponding to the appropriate state; and
         in response to receiving a command from the CLS specifying a desired state for the ESD valve, control the actuation system to move the valve mechanism to the desired state.

2. The system of claim 1, wherein the first communication channel is different from the second communication channel.

3. The system of claim 1, wherein the first communication channel comprises a wired connection between the CLS and the ESD valves, and wherein the second communication channel comprises a wireless connection between the CSM and the ESD valves.

4. The system of claim 1, wherein the first communication channel comprises a wired connection between the CLS and the ESD valves, and wherein the second communication channel comprises a wired connection between the CSM and the ESD valves.

5. The system of claim 1, wherein each of the ESD valves comprises a local power supply system configured to provide power for operating the valve mechanism.

6. The system of claim 1, further comprising:
   a central power supply system configured to provide operational power to each of the ESD valves,
   wherein each of the ESD valves comprises:
      a local power supply system; and
      a valve power interface configured to selectively route power from the central power supply system and the local power supply system for use in powering components of the ESD valve.

7. The system of claim 6, wherein the valve power interface is configured to:
   determine whether power for powering the components of the ESD valve is available from the central power supply system; and
   in response to determining that power for powering the components of the ESD valve is not available from the central power supply system, route power from the local power supply system for use in powering the components of the ESD valve.

8. The system of claim 1, further comprising:
   an instrument system comprising one or more instruments configured to obtain values for one or more process variables, wherein the instrument system comprises a third communication interface coupled to a third communication channel for communicating the values for one or more process variables to at least one of the plurality of emergency shutdown (ESD) valves; and
   wherein the local controller of each of the at least one ESD valves is configured to determine an appropriate state for the ESD valve based at least in part on the values for one or more process variables obtained from the instrument system.

9. The system of claim 1, wherein the local controller is configured to:
   receive an authorization code and a request to operate the valve in a given state;
   in response to determining that the authorization code is valid, control the actuation system to move the valve mechanism to the given state; and
   in response to determining that the authorization code is not valid, not control the actuation system to move the valve mechanism to the given state.

10. The system of claim 1, wherein the local controller is configured to:
    conduct a self-test operation;
    generate a report indicative of results of the self-test operation; and
    in response to determining that the ESD valve failed the self-test operation, generate an alert indicating that the ESD valve failed the self-test operation.

11. The system of claim 1, wherein the different operational states comprise at least a first fail-safe state and a second fail-safe state.

12. The system of claim 1, wherein the CSM is configured to determine a fail-safe state for the ESD valve based on the status information for the plant, wherein the current status information for the plant comprises the fail-safe state for the ESD valve, wherein determining an appropriate state for the ESD valve based at least in part on the current status information obtained from the CSM comprises determining the fail-safe state for the ESD valve based at least in part on the current status information obtained from the CSM, and wherein controlling the actuation system to move the valve mechanism to a position corresponding to the appropriate state comprises controlling the actuation system to move the valve mechanism to the fail-safe state.

13. A method comprising:
    receiving, by a local controller of an emergency shutdown (ESD) valve from a central logic solver (CLS) of an ESD system via a first communication channel, a command indicative of a first state for an ESD valve;
    controlling, by the local controller in response to the local controller receiving the command, the ESD valve to operate in the first state;
    obtaining, by the local controller from a central status monitor (CSM) of the ESD system via a second communication channel, current status information for the plant;
    determining, by the local controller, a second state for the ESD valve based at least in part on the current status information obtained from the CSM; and
    controlling, by the local controller, the ESD valve to operate in the second state.

14. The method of claim 13, wherein the first communication channel is different from the second communication channel.

15. The method of claim 14, wherein the first communication channel comprises a wired connection, and wherein the second communication channel comprises a wireless connection.

16. The method of claim 13, further comprising:
    determining whether power for powering components of the ESD valve is available from a central power supply system configured to provide operational power to the ESD valve; and
    in response to determining that power for powering the components of the ESD valve is not available from the central power supply system, route power from a local power supply system of the ESD valve for use in powering the components of the ESD valve.

17. The method of claim 13, wherein determining a second state for the ESD valve is based at least in part on values for one or more process variables obtained from an instrument system via a third communication channel.

18. The method of claim 13, further comprising:
    receiving an authorization code and a request to operate the valve in a given state; and
    in response to determining that the authorization code is valid, controlling the ESD valve to operate in the given state.

19. The method of claim 13, further comprising:
    determining, by the CLS, the desired state for the ESD valve based on status information for the plant; and
    issuing, by the CLS, the command indicative of a first state for an ESD valve via the first communication channel.

20. The method of claim 19, further comprising:
    maintaining, by the CSM, a current listing of current status information for the plant; and
    in response to determining that the CLS is unable to communicate with the ESD valve via the first communication channel, providing, to the ESD valve, the current status information for the plant.

21. The method of claim 13, wherein the ESD valve comprises:
    a valve mechanism configured to regulate the flow of a medium through a pipe; and
    an actuation system configured to move the valve mechanism between different operational states, and
    wherein controlling the ESD valve to operate in a given state comprises controlling the actuation system to move the valve mechanism to a position corresponding to the given state.

22. The method of claim 13, wherein the first state comprises a first fail-safe state and the second state comprises a second fail-safe state.

23. A non-transitory computer readable storage medium comprising program instructions executable by a computer processor to cause:
    receiving, by a local controller of an emergency shutdown (ESD) valve from a central logic solver (CLS) of an ESD system via a first communication channel, a command indicative of a first state for an ESD valve;

controlling, by the local controller in response to the local controller receiving the command, the ESD valve to operate in the first state;

obtaining, by the local controller from central status monitor (CSM) of the ESD system via a second communication channel, current status information for the plant;

determining, by the local controller, a second state for the ESD valve based at least in part on the current status information obtained from the CSM; and controlling, by the local controller, the ESD valve to operate in the second state.

24. The medium of claim 23, wherein the first communication channel is different from the second communication channel.

25. The medium of claim 24, wherein the first communication channel comprises a wired connection, and wherein the second communication channel comprises a wireless connection.

26. The medium of claim 23, the instructions further executable by the computer processor to cause:

determining whether power for powering components of the ESD valve is available from a central power supply system configured to provide operational power to the ESD valve; and in response to determining that power for powering the components of the ESD valve is not available from the central power supply system, route power from a local power supply system of the ESD valve for use in powering the components of the ESD valve.

27. The medium of claim 23, wherein determining a second state for the ESD valve is based at least in part on values for one or more process variables obtained from an instrument system via a third communication channel.

28. The medium of claim 23, the instructions further executable by the computer processor to cause:

receiving an authorization code and a request to operate the valve in a given state; and in response to determining that the authorization code is valid, controlling the ESD valve to operate in the given state.

29. The medium of claim 23, the instructions further executable by the computer processor to cause:

determining, by the CLS, the desired state for the ESD valve based on status information for the plant; and issuing, by the CLS, the command indicative of a first state for an ESD valve via the first communication channel.

30. The medium of claim 29, the instructions further executable by the computer processor to cause:

maintaining, by the CSM, a current listing of current status information for the plant; and in response to determining that the CLS is unable to communicate with the ESD valve via the first communication channel, providing, to the ESD valve, the current status information for the plant.

31. The medium of claim 23, wherein the ESD valve comprises:

a valve mechanism configured to regulate the flow of a medium through a pipe; and an actuation system configured to move the valve mechanism between different operational states, and wherein controlling the ESD valve to operate in a given state comprises controlling the actuation system to move the valve mechanism to a position corresponding to the given state.

* * * * *